(12) United States Patent
Sorokin (10) Patent No.: US 8,910,479 B1
(45) Date of Patent: Dec. 16, 2014

(54) METHOD FOR COOLING EXHAUST GASES FROM ENERGY UNITS (71) Applicant: Sergey Sorokin, Districto Turistico (DO)

(72) Inventor: Sergey Sorokin, Districto Turistico (DO)

( * ) Notice: Subject to any disclaimer, the term of this patent is extended or adjusted under 35 U.S.C. 154(b) by 0 days.

(21) Appl. No.: 14/298,241

(22) Filed: Jun. 6, 2014

(51) Int. Cl.
| | |
|---|---|
| *F02C 7/08* | (2006.01) |
| *F02C 6/00* | (2006.01) |
| *F01D 5/08* | (2006.01) |
| *F02C 3/30* | (2006.01) |
| *F02C 3/34* | (2006.01) |
| *F02C 7/141* | (2006.01) |
| *B01D 5/00* | (2006.01) |

(52) U.S. Cl.
CPC ... *F02C 3/30* (2013.01); *F02C 3/34* (2013.01); *F02C 7/141* (2013.01); *B01D 5/00* (2013.01)
USPC ............................. 60/689; 60/39.182; 60/39.5

(58) Field of Classification Search
USPC ...................................... 60/39.5, 39.182, 689
See application file for complete search history.

(56) References Cited

U.S. PATENT DOCUMENTS

| | | | | |
|---|---|---|---|---|
| 3,423,078 | A | * | 1/1969 | May .............................. 261/138 |
| 4,813,632 | A | * | 3/1989 | Woodhouse .................... 244/95 |
| 7,302,795 | B2 | * | 12/2007 | Vetrovec ........................ 60/309 |

* cited by examiner

*Primary Examiner* — Gerald L Sung
(74) *Attorney, Agent, or Firm* — Mark Terry (57) ABSTRACT

A system including an energy unit with an outlet for flue gases is disclosed. The system comprises a regulating nozzle for injecting water into the flue gases from the outlet, a condenser apparatus for extracting water from flue gases, a pump for pumping water from the condenser apparatus to the regulating nozzle, the water devoid of any chemical treatment, and a processor for receiving sensor data, calculating target water content of the flue gases at 100% humidity and a dew point of the flue gases and, calculating an amount of water to inject into the flue gases for: 1) increasing a water content of the flue gases to 100% humidity; 2) lowering a temperature of the flue gases to below the dew point and 3) such that the water is absorbed by the flue gases, and transmitting control signals to the regulating nozzle to inject said amount of water.

16 Claims, 11 Drawing Sheets

| Fuel type | % $N_2$ | % $CO_2$ | % $H_2O$ | Dew point, °C |
|---|---|---|---|---|
| $CH_4$ | 76.2 | 13.1 | 10.7 | 62 |
| $CH_3(OH)$ | 70.6 | 16.18 | 13.2 | 69 |
| CO:$H_2$ lean | 62.6 | 33.2 | 4.1 | 39 |
| CO:$H_2$ rich | 65.77 | 26.6 | 7.62 | 54 |
| $C_3H_8$ | 75.83 | 15.64 | 8.53 | 56 |
| $C_4H_{10}$ | 75.78 | 16 | 8.2 | 55 |
| $H_2$ | 78 | - | 22 | 84 |

FIG. 5A

| T °C | A g/m³ | T °C | A g/m³ | T °C | A g/m³ | T °C | A g/m³ | T °C | A g/m³ |
|---|---|---|---|---|---|---|---|---|---|
| 31 | 32.04 | 41 | 53.71 | 51 | 86.74 | 61 | 135.41 | 71 | 205.02 |
| 32 | 33.8 | 42 | 56.44 | 52 | 90.82 | 62 | 141.33 | 72 | 213.37 |
| 33 | 35.64 | 43 | 59.29 | 53 | 95.07 | 63 | 147.47 | 73 | 221.99 |
| 34 | 37.57 | 44 | 62.25 | 54 | 99.48 | 64 | 153.83 | 74 | 230.9 |
| 35 | 39.58 | 45 | 65.34 | 55 | 104.06 | 65 | 160.41 | 75 | 240.11 |
| 36 | 41.69 | 46 | 68.56 | 56 | 108.81 | 66 | 167.23 | 76 | 249.61 |
| 37 | 43.89 | 47 | 71.91 | 57 | 113.75 | 67 | 174.28 | 77 | 259.42 |
| 38 | 46.19 | 48 | 75.4 | 58 | 118.87 | 68 | 181.58 | 78 | 269.55 |
| 39 | 48.59 | 49 | 79.03 | 59 | 124.19 | 69 | 189.13 | 79 | 280 |
| 40 | 51.1 | 50 | 82.81 | 60 | 129.7 | 70 | 196.64 | 80 | 290.78 |

| Fuel type | Consumption of water for injection, g/kg | Gas cooling | Dew point after injection, °C |
|---|---|---|---|
| $CH_4$ | 27.3 | 130-66=64°C | 66 |
| $CH_3(OH)$ | 24.58 | 130-72=58°C | 72 |
| $CO:H_2$ lean | 35 | 130-50=80°C | 50 |
| $CO:H_2$ rich | 29.16 | 130-60=70°C | 60 |
| $C_3H_8$ | 28.75 | 130-61=69°C | 61 |
| $C_4H_{10}$ | 28.75 | 130-61=69°C | 61 |
| $H_2$ | 19 | 130-85=45°C | 85 |

FIG. 5D

| Injected water, gram | Resultant temperature, T, C | Resultant absolute humidity, A, g/m³ |
|---|---|---|
| 1.00 | 127.80 | 142.33 |
| 2.00 | 125.60 | 143.33 |
| 3.00 | 123.40 | 144.33 |
| 4.00 | 121.20 | 145.33 |
| 5.00 | 119.00 | 146.33 |
| 6.00 | 116.80 | 147.33 |
| 7.00 | 114.60 | 148.33 |
| 8.00 | 112.40 | 149.33 |
| 9.00 | 110.20 | 150.33 |
| 10.00 | 108.00 | 151.33 |
| 11.00 | 105.80 | 152.33 |
| 12.00 | 103.60 | 153.33 |
| 13.00 | 101.40 | 154.33 |
| 14.00 | 99.20 | 155.33 |
| 15.00 | 97.00 | 156.33 |
| 16.00 | 94.80 | 157.33 |
| 17.00 | 92.60 | 158.33 |
| 18.00 | 90.40 | 159.33 |
| 19.00 | 88.20 | 160.33 |
| 20.00 | 86.00 | 161.33 |
| 21.00 | 83.80 | 162.33 |
| 22.00 | 81.60 | 163.33 |
| 23.00 | 79.40 | 164.33 |
| 24.00 | 77.20 | 165.33 |
| 25.00 | 75.00 | 166.33 |
| 26.00 | 72.80 | 167.33 |
| 27.00 | 70.60 | 168.33 |
| 28.00 | 68.40 | 169.33 |
| 29.00 | 66.20 | 170.33 |
| 30.00 | 64.00 | 171.33 |

| Injected water, gram | Resultant temperature, T, C | Resultant absolute humidity, A, g/m³ |
|---|---|---|
| 1.00 | 127.80 | 190.13 |
| 2.00 | 125.60 | 191.13 |
| 3.00 | 123.40 | 192.13 |
| 4.00 | 121.20 | 193.13 |
| 5.00 | 119.00 | 194.13 |
| 6.00 | 116.80 | 195.13 |
| 7.00 | 114.60 | 196.13 |
| 8.00 | 112.40 | 197.13 |
| 9.00 | 110.20 | 198.13 |
| 10.00 | 108.00 | 199.13 |
| 11.00 | 105.80 | 200.13 |
| 12.00 | 103.60 | 201.13 |
| 13.00 | 101.40 | 202.13 |
| 14.00 | 99.20 | 203.13 |
| 15.00 | 97.00 | 204.13 |
| 16.00 | 94.80 | 205.13 |
| 17.00 | 92.60 | 206.13 |
| 18.00 | 90.40 | 207.13 |
| 19.00 | 88.20 | 208.13 |
| 20.00 | 86.00 | 209.13 |
| 21.00 | 83.80 | 210.13 |
| 22.00 | 81.60 | 211.13 |
| 23.00 | 79.40 | 212.13 |
| 24.00 | 77.20 | 213.13 |
| 25.00 | 75.00 | 214.13 |
| 26.00 | 72.80 | 215.13 |
| 27.00 | 70.60 | 216.13 |
| 28.00 | 68.40 | 217.13 |
| 29.00 | 66.20 | 218.13 |
| 30.00 | 64.00 | 219.13 |

| Injected water, gram | Resultant temperature, T, C | Resultant absolute humidity, A, g/m³ |
|---|---|---|
| 1.00 | 127.80 | 136.41 |
| 2.00 | 125.60 | 137.41 |
| 3.00 | 123.40 | 138.41 |
| 4.00 | 121.20 | 139.41 |
| 5.00 | 119.00 | 140.41 |
| 6.00 | 116.80 | 141.41 |
| 7.00 | 114.60 | 142.41 |
| 8.00 | 112.40 | 143.41 |
| 9.00 | 110.20 | 144.41 |
| 10.00 | 108.00 | 145.41 |
| 11.00 | 105.80 | 146.41 |
| 12.00 | 103.60 | 147.41 |
| 13.00 | 101.40 | 148.41 |
| 14.00 | 99.20 | 149.41 |
| 15.00 | 97.00 | 150.41 |
| 16.00 | 94.80 | 151.41 |
| 17.00 | 92.60 | 152.41 |
| 18.00 | 90.40 | 153.41 |
| 19.00 | 88.20 | 154.41 |
| 20.00 | 86.00 | 155.41 |
| 21.00 | 83.80 | 156.41 |
| 22.00 | 81.60 | 157.41 |
| 23.00 | 79.40 | 158.41 |
| 24.00 | 77.20 | 159.41 |
| 25.00 | 75.00 | 160.41 |
| 26.00 | 72.80 | 161.41 |
| 27.00 | 70.60 | 162.41 |
| 28.00 | 68.40 | 163.41 |
| 29.00 | 66.20 | 164.41 |
| 30.00 | 64.00 | 165.41 |

FIG. 5G

METHOD FOR COOLING EXHAUST GASES FROM ENERGY UNITS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of energy production, and more particularly relates to the field of devices for increasing the efficiency of energy units.

BACKGROUND OF THE INVENTION

An energy unit refers to an engine system that produces energy for consumption. A combined cycle energy unit (CCEU) is an assembly of engines that work in tandem from the same source of energy (such as heat), converting it into mechanical energy, which in turn usually drives generators, such as electrical generators. The principle is that the exhaust of one engine (including heat) is used as the energy source for another, thus extracting more useful energy from the source, increasing the system's overall efficiency. Combining two or more thermodynamic cycles results in improved overall efficiency, reducing fuel costs. In stationary power plants, a widely used combination for a CCEU is a gas turbine burning natural gas or synthesis gas from coal, whose hot exhaust powers a steam power plant. This is called a combined cycle gas turbine (CCGT) plant, and such an arrangement is also used for marine propulsion. Other historically successful combined cycles have used hot cycles with mercury vapor turbines, magnetohydrodynamic generators or molten carbonate fuel cells, with steam plants for the second cycle.

In conventional CCGTs, there is a large amount of heat that leaves the system in the condenser or heat exchanger of system. The exhaust gases generated in a steam injected engine leave at a higher temperature and have a higher specific heat. Hence, in the absence of some form of heat recovery system, the overall efficiency of the engine decreases. Further gas turbine designs have included processes for recovering water from exhaust or flue gases and re-using the water in the gas turbine. The composition of modern gas turbine engines, however, cannot adequately withstand the introduction of corrosive substances and like materials. Therefore, gas turbine engine designs of this type have required a chemical water treatment apparatus to treat or distill the water before it is introduced back into the gas turbine engine, as taught by Image (U.S. Pat. No. 7,594,387). The addition of a water treatment module, however, increases the complexity, maintenance and operating costs of the resulting gas turbine engine system.

Therefore, a need exists to overcome the problems with the prior art as discussed above, and particularly for more effective and efficient energy units.

SUMMARY OF THE INVENTION

Briefly, according to the disclosed embodiments, a system including an energy unit with an outlet for flue gases is disclosed. The system comprises a regulating nozzle for injecting water into the flue gases from the outlet of the energy unit, a condenser apparatus for extracting water solely from flue gases from the outlet of the energy unit, a pump for pumping water directly from the condenser apparatus to the regulating nozzle, wherein the regulating nozzle injects water supplied solely from the condenser apparatus, and where in the water provided to the regulating nozzle is devoid of any chemical treatment and a processor communicatively coupled to the regulating nozzle, wherein the processor is configured for, receiving sensor data comprising a current temperature of the flue gases and a current water content of the flue gases, calculating, based on the sensor data, the following metadata: target water content of the flue gases at 100% humidity of the flue gases, and a dew point of the flue gases at said water content, calculating, based on the sensor data and the metadata, an amount of water to inject into the flue gases wherein said amount of water is configured for: 1) increasing a water content of the flue gases to the target water content, so as to reach substantially 100% humidity of the flue gases; 2) lowering a temperature of the flue gases to below the dew point of the flue gases and 3) such that substantially all of said amount of water is absorbed by the flue gases, and transmitting control signals to the regulating nozzle, and wherein the control signals are configured to command the regulating nozzle to inject said amount of water into the flue gases.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the disclosed embodiments will be apparent from the following detailed description taken in conjunction with the accompanying drawings.

DETAILED DESCRIPTION

The disclosed embodiments solve problems with the prior art by providing a more efficient condenser or heat exchanger of an energy unit that re-uses the pure or nearly pure water by-product of fuel combustion in a self-sustainable way. The condenser or heat exchanger of the disclosed embodiments allow the system to garner heat from flue gases and use it (thereby increasing the efficiency of the system) and to produce a net amount of pure or nearly pure water, which may be re-used in the system or sold. The disclosed embodiments improve upon the prior art by injecting water into the exhaust gases of an energy unit, thereby increasing power yield of the system, while reducing fuel consumption, and resulting in a more efficient gas turbine engine system. The disclosed embodiments further improve upon the prior art by eliminating or reducing the need for an external source of water to inject into the energy unit, as well as eliminating or reducing the need for a chemical treatment process to distill water before injecting it into the energy unit. The reduction or elimination of a chemical treatment module reduces the weight, size and complexity of the entire system, thereby reducing manufacture, service and maintenance costs of the system.

Figure 1:
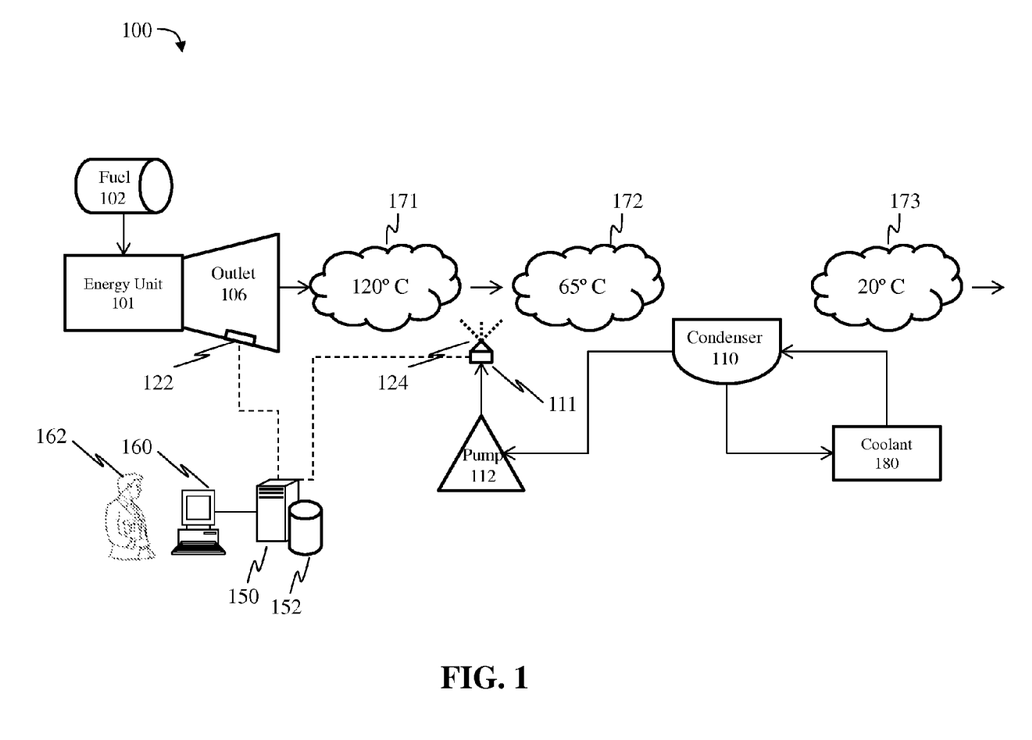
FIG. 1 is a block diagram showing the main components of a system for increasing condensation of water from exhaust gases in an energy unit, in accordance with one embodiment.

FIG. 1 is a block diagram showing the main components of a system 100 system for increasing condensation of water from exhaust gases in an energy unit. The system 100 includes an energy unit 101 which may be a gas turbine system, a combined cycle gas turbine system, or the like. Fuel 102 may provide the fuel necessary to power the energy unit 101. The energy unit 101 expels flue gases 171 from the outlet 106 or the exhaust portion of energy unit 101. Flue gases 171 expelled from the outlet 106 may have a temperature, for example, of up to 120 degrees Celsius.

System 100 may further include a first regulating nozzle or valve 124 located within, or subsequent to, the outlet 106 of energy unit 101. A regulating nozzle or valve is a device that regulates, directs or controls the flow of water—in liquid or vapor form—by opening, closing, or partially obstructing various passageways. A regulating nozzle or valve comprises an aperture for egress of water—in liquid or vapor form—and a motor for opening and closing the aperture. The regulating nozzle or valve 124 also includes a computing device 111, such as a PCB, CPU, programmable logic controller (PLC), remote terminal unit (RTU), digital computer, programmable logic relay (PLR), computer relay or other computerized communications device for receiving commands from another computer regarding opening and closing the aperture. The regulating nozzle 124 inserts or sprays water into the flue gases 171 to lower the flue gas temperature and increase the humidity of the exhaust gases. Subsequent to the spraying by nozzle 124, the flue gases 172 may, for example, have a lower temperature of about 65 degrees Celsius.

A condenser apparatus 110 receives the flue gases 172. The condenser apparatus 110 is a device or unit used to condense vapor, such as water vapor, in the flue gases into liquid form. The condenser apparatus 110 may also include a heat exchanger, which may comprise a set of pipes in conductive contact with the flue gases, wherein the pipes travel to and from an engine or a coolant tower. Cooler water (i.e., water at a lower temperature) is pumped from the coolant tower to the heat exchanger, which is in conductive contact with the flue gases in conduit 104. As the water within the pipes is heated by the flue gases, the flue gases decrease in temperature to the dew point and produce condensate (i.e., water in liquid form). The heated water in the pipes of the heat exchanger then return to an engine (such as a steam engine where the heat is used to power another energy unit) or to a coolant tower, wherein heat is released and returns once more to the heat exchanger. Subsequent to passing through the condenser 110, the flue gases 173 may have a lower temperature, for example, of about 20 degrees Celsius.

The condenser apparatus 110 may also include a container for holding the water condensed by apparatus 110. A pump 112 pumps the water from the container of the condenser apparatus 110 to the regulating nozzle or valve 124. Alternatively, the pump 112 pumps the water from the container of the condenser apparatus 110 to a water vapor generator, also known as a boiler, which raises the temperature of the water to boiling temperature, thereby changing its phase to gas form. Subsequently, the water, in gas form, is provided to the regulating nozzle 124. The water vapor generator may use the high temperature of the flue gases escaping the energy unit 101 to heat the water into gas form.

Methane is one example of a fuel that may be used as fuel 102, though the present invention supports the use of any fuel containing hydrogen as 30% or more of its fuel weight fraction. Other examples of fuel that may be used as fuel 102 include butane, propane, hydrogen, syngas, methanol or their derivatives. In the embodiment wherein the fuel used by the system 100 is methane, the combustion of methane operates according to the following equations: $CH_4 + 2O_2 \rightarrow CO_2 + 2H_2O$. Therefore, the combustion of methane results in the production of water as a by-product. In the embodiment wherein the fuel used by the system 100 is propane, the combustion of propane operates according to the following equations: $C_3H_8 + 5O_2 \rightarrow 3CO_2 + 4H_2O$. In the embodiment wherein the fuel used by the system 100 is butane, the combustion of butane operates according to the following equations: $2C_4H_{10} + 13O_2 \rightarrow 8CO_2 + 10H_2O$. Therefore, the combustion of propane and butane also results in the production of water as a by-product.

In one embodiment, all of the water injected by the regulating nozzle 124 originates solely from the container of the condenser apparatus 110—that is, no outside sources of water are used for regulating nozzle 124. Consequently, the water recycling process of system 100 is self-sustained, in that the system 100 requires no external source of water since the system 100 re-uses the water by-product of the combustion of methane. This is an improvement over the prior art, since it eliminates the need for a water treatment apparatus to treat water and eliminate any impurities before introduction into the gas turbine engine. Consequently, the present invention boasts a simpler design with fewer components, lower operating costs, less maintenance and increased efficiency over the conventional gas turbine engines of the prior art. Moreover, the present invention increases power yield of the system 100.

Furthermore, the amount of water produced as a by-product of the combustion of methane greatly exceeds the amount of water re-used by the system 100. Therefore, even accounting for the re-use of water by the regulating nozzle 124, the system 100 also produces a net amount of pure, distilled water that can be used for other purposes or sold to third parties.

Pure, distilled water has a significant price on the market, and therefore can be used as a revenue stream. For example, any excess water may be used as water for injecting into other gas turbine engines.

A prominent element of FIG. 1 is the computer 150 associated with repository or database 152. Computer 150 is a central controller or operator for water regulating nozzle 124. Computer 150 reads sensor data, calculates the amount of water that shall be injected by the water regulating nozzle 124, and then transmits control signals to the computing device 111 of the water regulating nozzle 124, wherein the control signals are configured to command the regulating nozzle 124 to inject predefined amounts of water into the system 100. FIG. 1 also shows dotted communications lines connecting the computer 150 to sensors 122, as well as to computing device 111, such that computer 150 controls the nozzle 124.

Computer 160 corresponds to an administrator or technician 162, who may perform supervisory or administrative tasks that affect computer 150. Administrator 162 may, for example, set quantities or parameters for amounts of water to be dispersed by the water regulating nozzle 124. Computer 160 may be a mobile computing device, a desktop computer, a common computer terminal or the like. Computer 150 may be a server, a workstation, a virtual machine, a mobile computing device, a desktop computer, a common computer terminal or the like. Computers 150 and 160 may be connected via a communications network FIG. 1 further shows that computer 150 includes a database or repository 152, which may be a relational database comprising a Structured Query Language (SQL) database stored in a SQL server. The repository 152 serves data from a database, which is a repository for data used by computers 150, 160 during the course of operation of the invention. Database 152 may be distributed over one or more nodes or locations that are connected via a communications network. The database 152 may include one or more stored values located in various types of storage structures, such as linked lists, dynamic linked libraries, arrays, multi dimensional arrays, data constructs, objects or lookup tables. In one embodiment, the stored values are embedded in one or more lookup tables. The lookup table may comprise a data structure comprising a list or chart wherein each line or row lists data values or ranges of data values for sensor data. FIGS. 5A through 5G are examples of lookup tables that may be stored in the database 152.

It should be noted that although FIG. 1 shows only two computers 150 and 160, the system of the present invention supports any number of computing devices, which may be connected via a network. Computers 150 and 160 may include program logic comprising computer source code, scripting language code or interpreted language code that may be compiled to produce an executable file or computer instructions, or that may be interpreted at run-time, wherein the computer source code performs various functions of the present invention. Note that although computer 150 is shown as a single and independent entity, in one embodiment of the present invention, the functions of computer 150 may be integrated with another entity, such as computer 160. Further, computer 150 and its functionality, according to a preferred embodiment of the present invention, can be realized in a centralized fashion in one computer system or in a distributed fashion wherein different elements are spread across several interconnected computer systems. Also note that although FIG. 1 shows only one computing device 111 and associated nozzle 124, the system of the present invention supports any number of computing devices and associated nozzles.

The nozzle 124 allows for the introduction of water or steam into the gases 171 and serves to increase the humidity of the flue gases, to lower the temperature of the gases to the dew point and enabling condensation to take place, thereby inducing water vapor in the flue gases to change transition to liquid form, to give off heat during the transition and allowing the liquid water to be collected in a container of condenser apparatus 110. Another advantage of injecting water into the gases 171 is the reduction in aerodynamic flue gas resistance due to extraction of water from the flue gases. In one embodiment, the nozzle 124 inserts an amount of water (calculated by computer 150) necessary to increase the humidity of the flue gases 171 to 100%, thereby enabling the condensation process of the condenser apparatus 110.

The energy unit 101 may further include one or more sensors 122 located in or around the outlet 106 of the energy unit 101. In one embodiment, the sensors 122 may comprise at least one of a temperature sensor, a humidity sensor, a mass flow sensor, a pressure sensor and a gas composition sensor. A temperature sensor provides temperature data while a pressure sensor provides pressure data. A humidity sensor measures the moisture content of a gas. In the outlet 106, a gas composition sensor may sense and report the amount of water in the flue gases. A humidity sensor may measure the moisture content of the flue gases and report the water moisture content data to the computer 150. Based on the moisture content of the flue gases, and other data, the computer 150 may calculate how much water to disperse into the gases 171.

Further note that FIG. 1 shows that regulating nozzle 124 is communicatively coupled with, and is controlled by, computer 150. Recall that a regulating nozzle comprises an aperture for egress of water, and a motor for opening and closing the aperture. The motor of each nozzle 124 is controlled by computing device 111, which reacts to commands received by computer 150, thereby affecting the amount of water injected by said nozzle. FIG. 1 also shows that sensors 122 are communicatively coupled with, and transmit sensor data to, computer 150.

Figure 2:
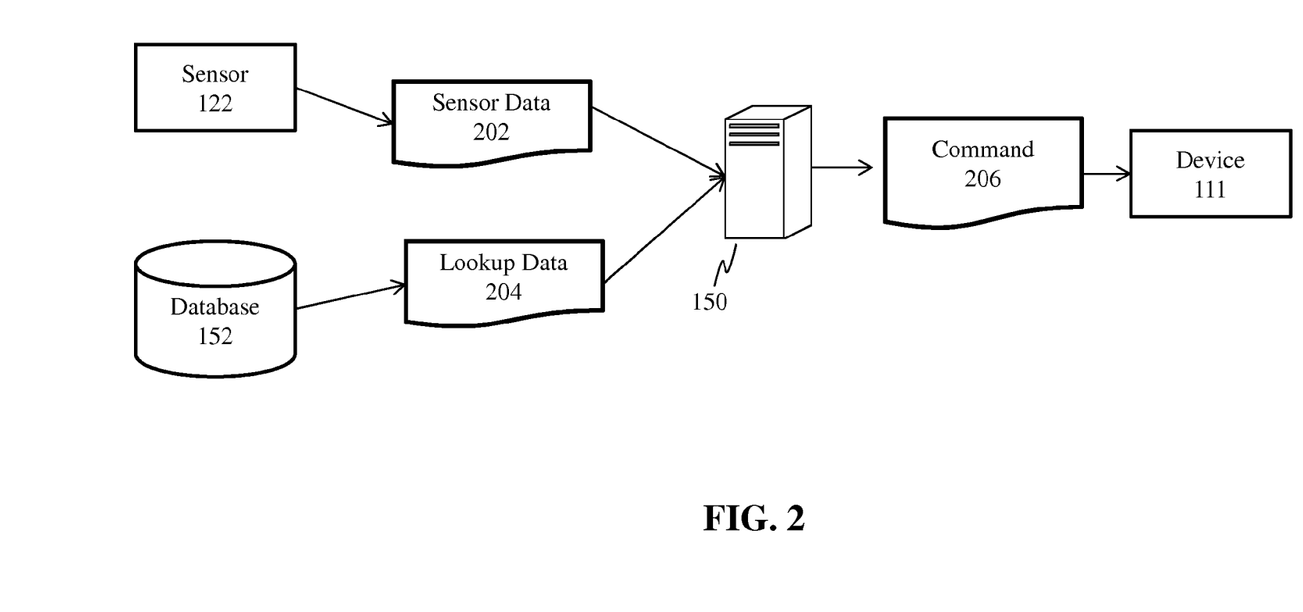
FIG. 2 is a block diagram showing the data flow of the system for increasing condensation of water from exhaust gases in an energy unit, in accordance with one embodiment.
Figure 3:
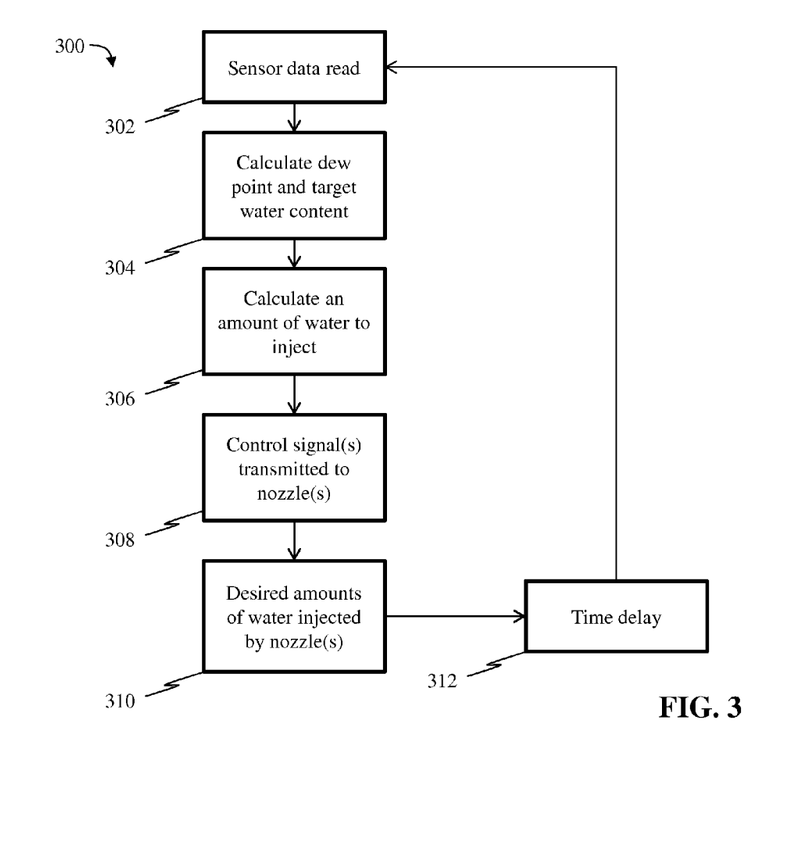
FIG. 3 is a flow chart depicting the general control flow of a process for increasing condensation of water from exhaust gases in an energy unit, in accordance with one embodiment.

FIG. 3 is a flow chart depicting the general control flow of a process for increasing condensation of water from exhaust gases in an energy unit, in accordance with one embodiment. Specifically, the method 300 describes how computer 150 reads data from various sources, calculates the appropriate amounts of water to inject into gases 171 and commands the nozzle 124 to inject said appropriate amounts of water. Method 300 is described with reference to FIGS. 1 and 2, as well as FIGS. 5A through 5G.

In a first step 302, the computer 150 reads sensor data 202 in real time, or near real time, from the sensors 122. Sensor data from a temperature sensor may comprise a temperature value (such as in Celsius units) while sensor data from a pressure sensor may comprise a pressure value (such as in psi units, Pascal units, or $kg/(ms^2)$ units) and sensor data from a humidity sensor may comprise a moisture content value (such as a percentage or in units of grams of water per meter cubed or $g/m^3$). Sensor data from a mass flow sensor may comprise a mass flow value (such as grams per second or density per second, i.e., grams per centimeter cubed per second). Sensor data from a gas composition sensor may comprise a gas composition value (such as ppm or percentage of volume or density, i.e., grams per centimeter cubed).

Figure 5A:
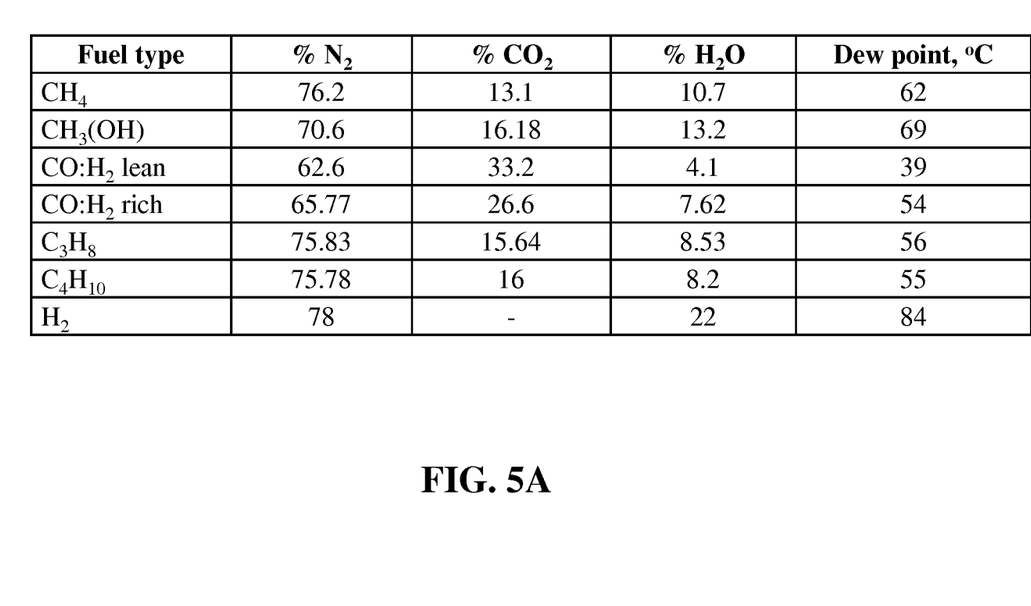
FIG. 5A is a table showing the percentage of fuel combustion products in flue gases.
Figure 5B:
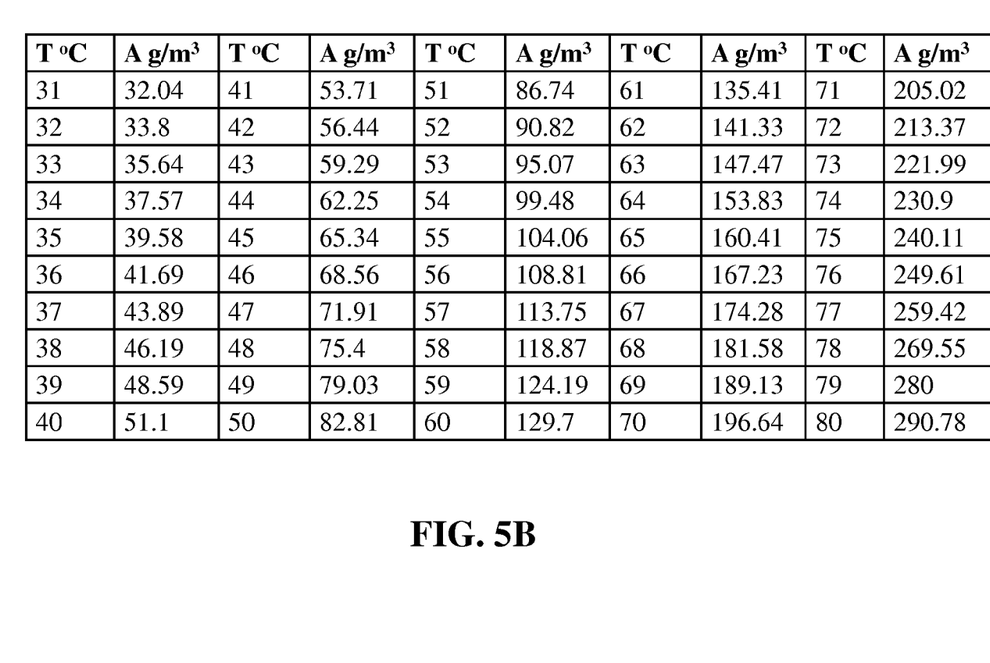
FIG. 5B is a table of showing the correlation of the dew point occurring at a certain temperature (° C.) and water content in the air (g/m$^3$).

In step 304, the computer 150 calculates, based on the sensor data 202, the following metadata: target water content of the flue gases 171 at 100% humidity of the flue gases (i.e., how much water per unit of volume the flue gases must possess in order to reach 100% humidity, which is the highest allowed water-saturation of said gases), and a dew point of the flue gases 171 at said humidity (recall that the dew point of a gas changes as its humidity changes—see table of FIG. 5B). In one embodiment, the computer 150 performs said calculation using a variety of formulas known in the art for generating said data, such as the Clausius-Clapeyron equation and approximations of the same. One of said example formulas includes:

$$B=(\ln(RH/100)+((17.27*T)/(237.3+T)))/17.27$$

$$D=(237.3*B)/(1-B)$$

wherein RH comprises relative humidity as a percentage, D is the dew point in Celsius, T is the temperature in Celsius and B is an intermediate value.

In one embodiment, the computer 150 performs said calculation of step 304 using a lookup table. The computer 150 compares a subset of the sensor data 202 read in step 302 to data in a stored lookup table. The lookup table may list sensor data values or ranges of sensor data values and corresponding metadata for said data values or ranges of sensor data values, wherein said metadata includes target water content of the flue gases 171 at 100% humidity of the flue gases, and a dew point of the flue gases 171 at said humidity. In one embodiment, the stored lookup table may be stored in volatile memory, such as RAM, or non-volatile memory, such as ROM, EPROM or flash memory.

In step 306, the computer 150 calculates, based on the sensor data collected in step 302 and the metadata calculated in step 304, an amount of water to inject into the flue gases 171 wherein said amount of water is configured for: 1) increasing the water content of the flue gases 171 to the target water content, so as to reach substantially 100% humidity of the flue gases; 2) lowering a temperature of the flue gases 171 to below the dew point of the flue gases and 3) such that substantially all of said amount of water is absorbed by the flue gases. See below for a more detailed description of the calculation of step 306, including examples.

Also in step 306, the computer 150 may calculate how much and/or how long to open the valve of device 124 in order to allow the desired amount of water that was calculated above to be injected into the gases 171. For example, the computer 150 may calculate an aperture reference that defines how much to open the valve or aperture of device 124 and/or a timing reference that defines how long to open the valve or aperture of device 124. Alternatively, the step of calculating how much and/or how long to open the valve of device 124 may be performed by device 111.

In step 308, the computer 150 transmits a control signal or command 206 to device 111 of nozzle 124, wherein each control signal or command is configured to command the respective regulating nozzle to inject the desired amount of water that was calculated in step 306. In step 310, responsive to the signal or command 206 received in step 308, the one or more regulating nozzles 124 respectively inject the amount of water commanded by computer 150. In step 312, a set period of time passes. In one embodiment, step 312 includes the passing of 500 milliseconds. Subsequently, control flows immediately back to step 302 wherein steps 302 through 312 are executed periodically.

Note that in a conventional gas turbine engine, recycled water must be chemically treated before it is injected into the gas turbine engine. This involves expenditure in time, resources and money. The disclosed embodiments solve this problem by fully recycling the water that is recaptured from flue gases in the outlet of the unit 101. This results in a simpler energy system that eliminates or reduces the need for a chemically treated water block.

The following provides more detail regarding the calculation of step 304 of method 300 above. FIG. 5A is a table showing the percentage of fuel combustion products in flue gases, such as gases 171. For each combustion product, the composition of the resulting flue gases (shown as percentages) is provided. Also, for each combustion product, the dew point of the resulting flue gases (shown in Celsius units) is provided. Thus, for each combustion product, the table shows the dew point temperature, below which the water in the flue gases will condense, turn into liquid form and release thermal energy in the amount of 2.2 MJ/kg (wherein said thermal energy may be collected by the system 100, such as in a combined cycle energy unit). The following will focus on the use of methane ($CH_4$) as a combustion product.

Similarly to the table of FIG. 5A, FIG. 5B is a table showing the correlation of the dew point of flue gases (from methane combustion) occurring at a certain temperature ("T" shown in units of ° C.) and water content in the air ("A" shown in units of $g/m^3$). The table of FIG. 5B shows that as the water content ($g/m^3$) of flue gases changes, so does the dew point (° C.) of said gases. Thus, the table of FIG. 5B provides a dew point for methane flue gases at each humidity level.

Figure 5C:
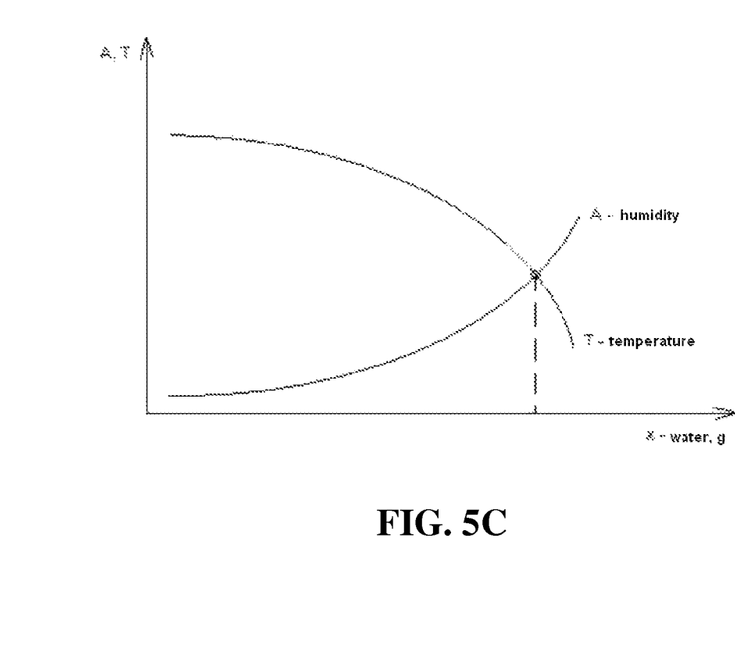
FIG. 5C is a graphical representation showing the relative humidity of a gas versus water content and showing the temperature of a gas versus water content.

FIG. 5C is a graphical representation showing the relative humidity of a flue gas versus water content and showing the temperature of a gas versus water content. Note the graph of FIG. 5C shows two plots overlaid on each other. FIG. 5C shows a function $f(x)=A$ that plots the humidity of a flue gas as the water content x (in grams, g) of the flue gas is increased (assuming a temperature and pressure at which the flue gas will hold said water content in the gaseous state). Note that as the water content x of the flue gases is increased, the humidity A increases. FIG. 5C also shows a function $g(x)=T$ that plots the temperature of a flue gas as the water content x (in grams, g) of the flue gas is increased (assuming a temperature and pressure at which the flue gas will hold said water content in the gaseous state). Note that as the water content x of the flue gases is increased, the temperature T decreases. The purpose of the calculation of step 306 is to calculate, as close as possible, the water content x for which humidity $f(x)=100\%$ and temperature $g(x)=$dew point, i.e., the water content x at which the flue gases are fully saturated and the temperature of the saturated flue gases is at the dew point, wherein said water in the flue gases will condense, turn into liquid form and release thermal energy.

Note that the target water content x, which satisfies the conditions above, may only apply to a sample of the flue gases 171. That is, the target water content x may have been calculated for a small amount of flue gases 171 representing a normalized value for volume, such as one meter cubed. Thus, the target water content x may not represent the actual amount of water that must be added to the flue gases 171, but rather indicates how much water per unit of volume must be added to the flue gases 171. Part of the calculation made by computer 150 in step 306 may include calculating the water content x for a normalized value of volume and then extrapolating an absolute amount of water (such as in grams or kilograms) must be added to the actual volume of the flue gases 171 to achieve 100% humidity and the dew point (or below same).

Figure 5D:
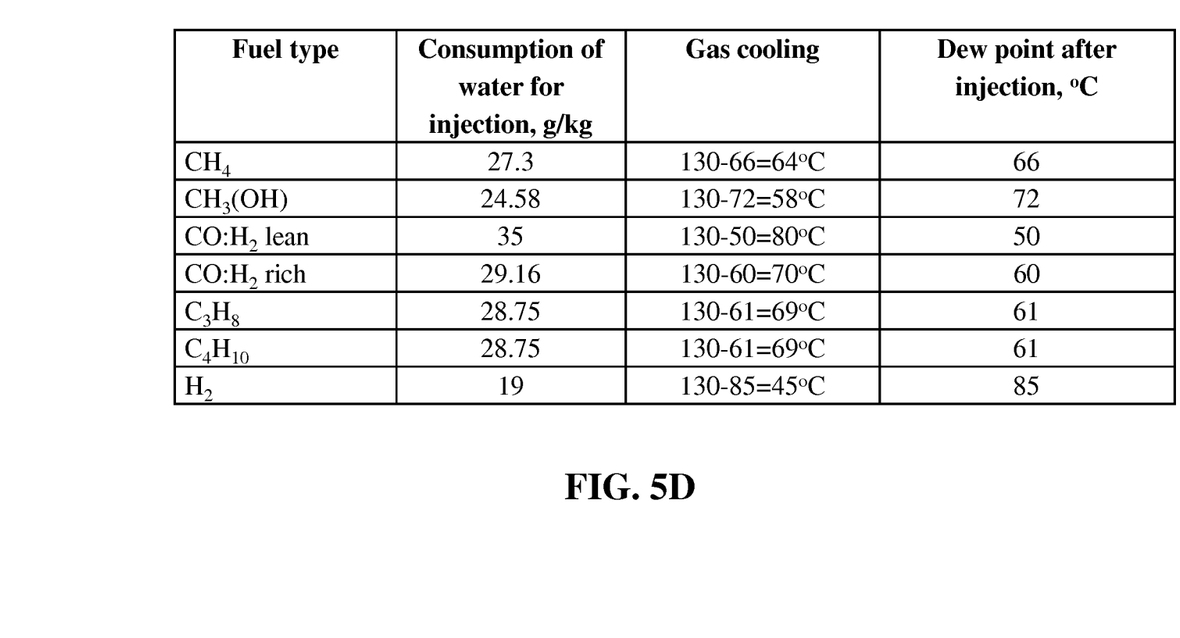
FIG. 5D is a table showing, for each fuel type, an amount a gas is cooled and a corresponding dew point temperature when a given amount of water is injected into said gas.

The following provides more detail regarding the calculation of step 306 of method 300 above. FIG. 5D is a table showing, for each fuel type, an amount a gas is cooled and a corresponding dew point temperature when a given amount of water is injected into said flue gas. Assuming an initial temperature of 130 degrees Celsius, a predefined initial humidity and atmospheric pressure at 0.9 ata to about 1.1 ata, the table of FIG. 5D shows, for each combustion product, the maximum amount of water that can be absorbed by the flue gas, how much the gas will cool and the dew point of the gas after injection. For example, for methane, the table of FIG. 5D shows that the maximum amount of water that can be absorbed by the flue gas is 27.3 grams, the gas will cool 66 degrees Celsius to 64 degrees and that the new dew point is 66 degrees.

Figure 5E:
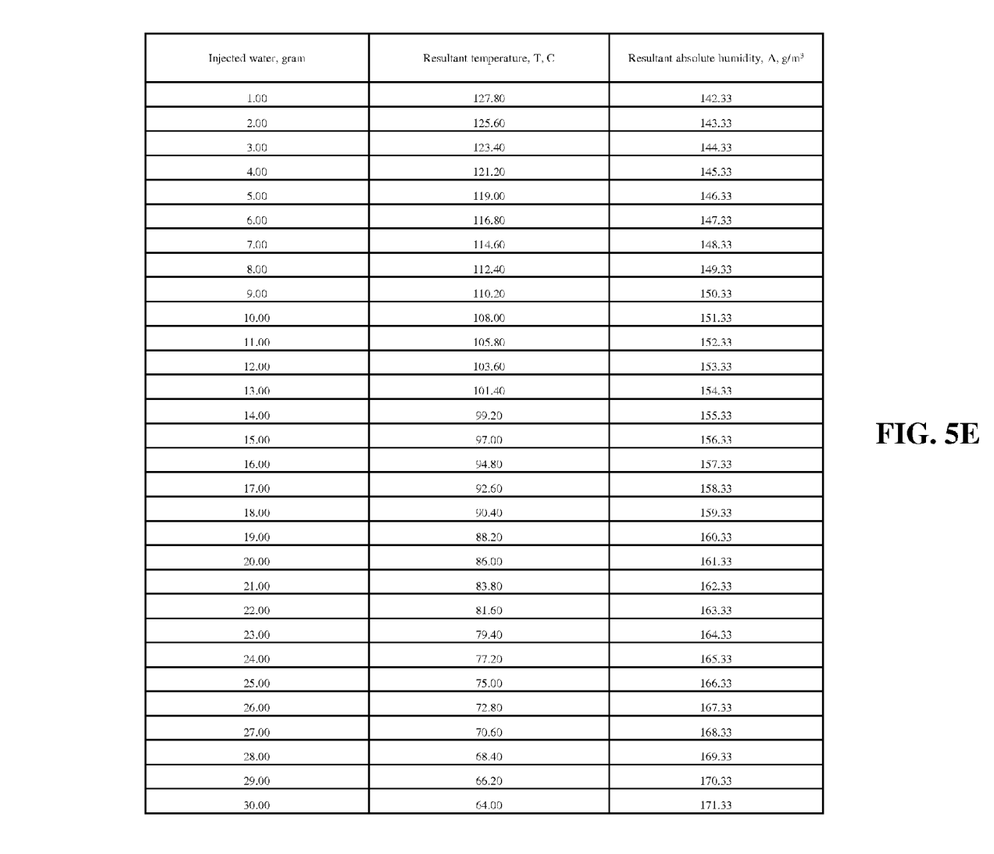
FIG. 5E is a table showing a resultant temperature and humidity of a gas when a given amount of water is added to said gas.

Following shows how the step 306 may be calculated. FIG. 5E is a table showing a resultant temperature and humidity of a flue gas (of methane combustion) when a given amount of water is added to said gas. Assuming an initial temperature of 130 degrees Celsius, an initial humidity of 141.33 ($g/m^3$) and atmospheric pressure at 0.9 ata to about 1.1 ata, the table of FIG. 5E shows, for a methane combustion product, the resultant temperature and humidity of the flue gas when a given amount of water is added to the flue gas. For example, if 10 g of water is injected, the table of FIG. 5E shows the flue gas will lower its temperature to 108 degrees and the humidity will increase to 151.33. At 151.33 humidity, however, the dew point of the flue gas is 64 degrees (see table of FIG. 5B), which is much lower than the current temperature of the gas (108 degrees), and thus, not enough water has been injected to reach the dew point.

In another example, if 30 g of water is injected, the flue gas will lower its temperature to 64 degrees and the humidity will increase to 171.33. At 171.33 humidity, however, the dew point of the flue gas is 67 degrees (see table of FIG. 5B), which is higher than the current temperature of the gas (64 degrees), and thus, too much water has been injected and the excess water will fail to evaporate, thereby increasing waste.

In a final example, if 29 g of water is injected, the flue gas will lower its temperature to 66 degrees and the humidity will increase to 170.33. At 170.33 humidity the dew point of the flue gas is 66 degrees (see table of FIG. 5B), which is substantially the current temperature of the gas, and thus, just enough water has been injected, all injected water will evaporate and be absorbed into the flue gases, thereby producing little or no waste.

Figure 5F:
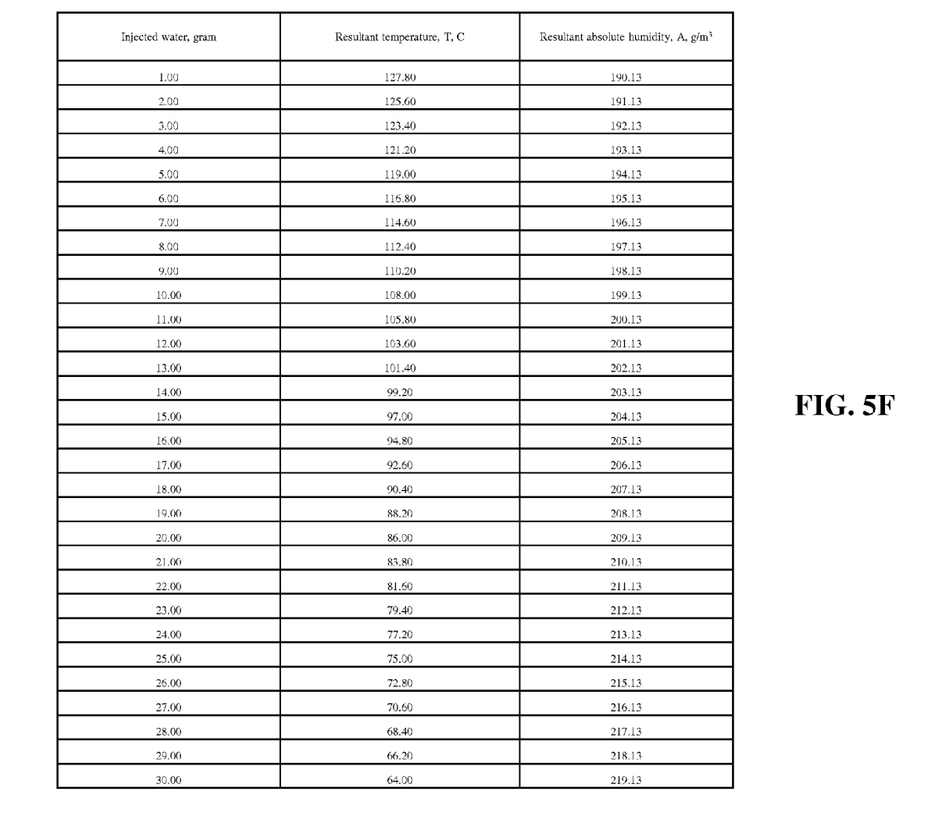
FIG. 5F is another table showing a resultant temperature and humidity of a gas when a given amount of water is added to said gas.

Following provides another example how the step 306 may be calculated. FIG. 5F is a table showing a resultant temperature and humidity of a flue gas (of methanol combustion) when a given amount of water is added to said gas. Assuming an initial temperature of 130 degrees Celsius, an initial humidity of 189.13 ($g/m^3$) and atmospheric pressure at 0.9 ata to about 1.1 ata, the table of FIG. 5F shows, for a methanol combustion product, the resultant temperature and humidity of the flue gas when a given amount of water is added to the flue gas. For example, if 26 g of water is injected, the table of FIG. 5F shows the flue gas will lower its temperature to 72.8 degrees and the humidity will increase to 215.33. At 215.13 humidity, the dew point of the flue gas is substantially equal to the current temperature of the gas, and thus, just enough water has been injected such that substantially all of the injected water evaporates.

Figure 5G:
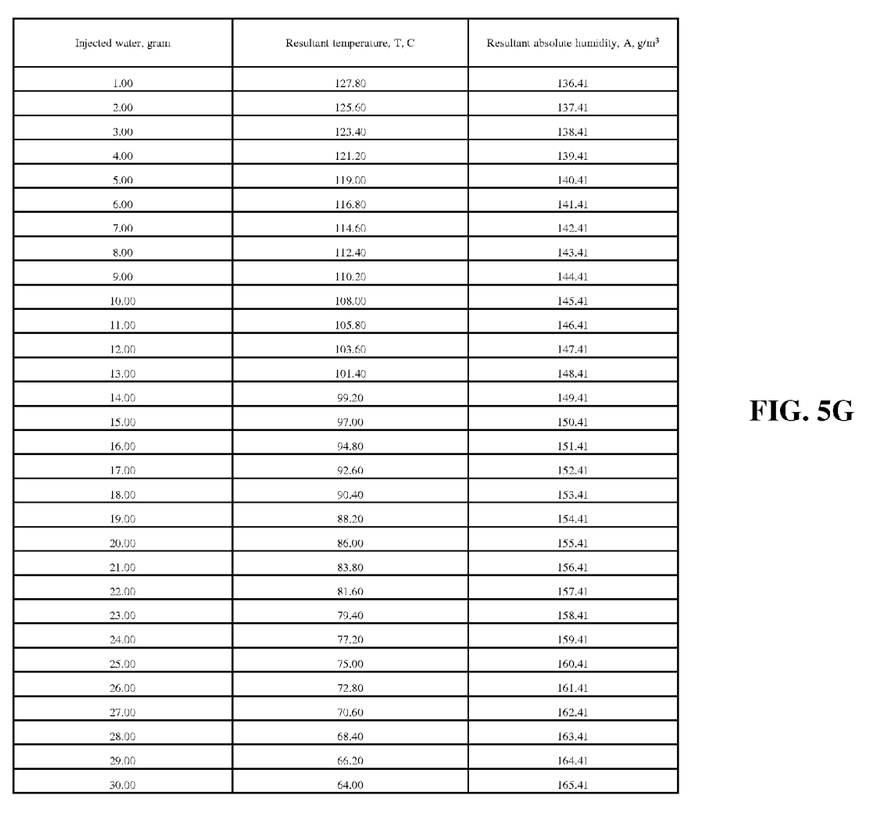
FIG. 5G is yet another table showing a resultant temperature and humidity of a gas when a given amount of water is added to said gas.

Following provides yet another example how the step 306 may be calculated. FIG. 5G is a table showing a resultant temperature and humidity of a flue gas (of propane combustion) when a given amount of water is added to said gas. Assuming an initial temperature of 130 degrees Celsius, an initial humidity of 135.41 ($g/m^3$) and atmospheric pressure at 0.9 ata to about 1.1 ata, the table of FIG. 5G shows, for a propane combustion product, the resultant temperature and humidity of the flue gas when a given amount of water is added to the flue gas. For example, if 29 g of water is injected, the table of FIG. 5G shows the flue gas will lower its temperature to 66.2 degrees and the humidity will increase to 164.41. At 164.41 humidity, the dew point of the flue gas is substantially equal to the current temperature of the gas, and thus, just enough water has been injected such that substantially all of the injected water evaporates.

Figure 4:
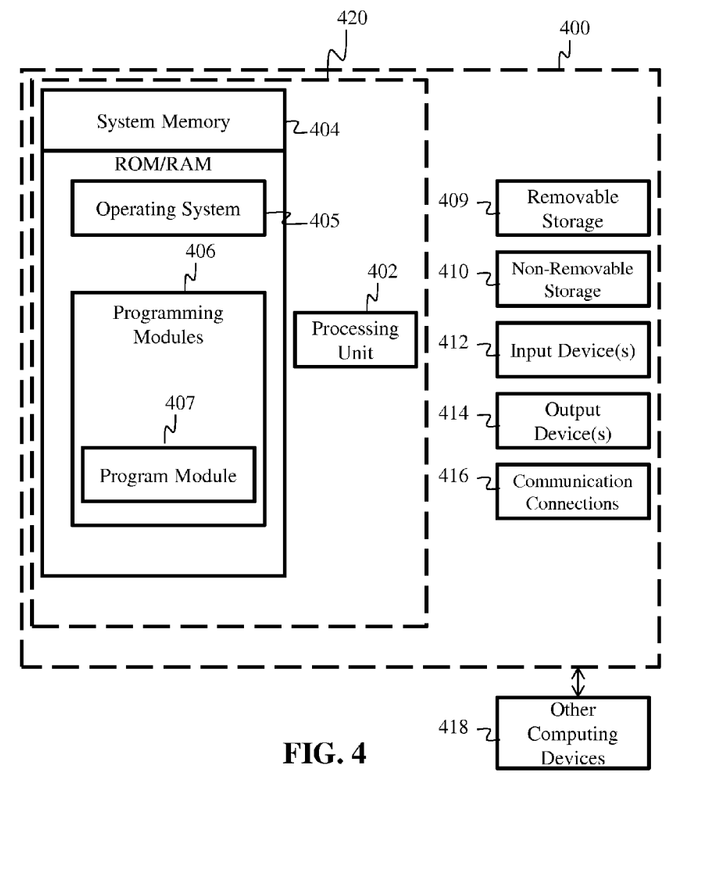
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 150 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the method 300 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods 300 above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A system including an energy unit with an outlet for flue gases, the system comprising:
   a regulating nozzle for injecting water into the flue gases from the outlet of the energy unit;
   a condenser apparatus for extracting water solely from flue gases from the outlet of the energy unit;
   a pump for pumping water directly from the condenser apparatus to the regulating nozzle, wherein the regulating nozzle injects water supplied solely from the condenser apparatus, and where in the water provided to the regulating nozzle is devoid of any chemical treatment; and
   a processor communicatively coupled to the regulating nozzle, wherein the processor is configured for:
      receiving sensor data comprising a current temperature of the flue gases and a current water content of the flue gases;
      calculating, based on the sensor data, the following metadata: target water content of the flue gases at 100% humidity of the flue gases, and a dew point of the flue gases at said water content, and;
      calculating, based on the sensor data and the metadata, an amount of water to inject into the flue gases wherein said amount of water is configured for: 1) increasing a water content of the flue gases to the target water content, so as to reach 100% humidity of the flue gases; 2) lowering a temperature of the flue gases to below the dew point of the flue gases and 3) such that all of said amount of water is absorbed by the flue gases; and
      transmitting control signals to the regulating nozzle, and wherein the control signals are configured to command the regulating nozzle to inject said amount of water into the flue gases.

2. The system of claim 1, wherein the regulating nozzle comprises:
   an aperture for egress of water, and a motor for opening and closing the aperture.

3. The system of claim 1, wherein the regulating nozzle comprises:
   an aperture for egress of water, and a valve for opening and closing the aperture.

4. The system of claim 1, further comprising:
   at least one sensor located in the outlet of the energy unit, wherein the at least one sensor comprises both a temperature sensor and a humidity sensor, and wherein both the temperature sensor and the humidity sensor are is communicatively coupled with the processor.

5. The system of claim 4, wherein the at least one sensor is configured for transmitting sensor data to the processor.

6. The system of claim 1, further comprising:
at least one sensor located in the outlet of the energy unit, wherein the at least one sensor comprises the following five sensors: a temperature sensor, a humidity sensor, a mass flow sensor, a pressure sensor and a gas composition sensor, and wherein said five sensors are all communicatively coupled with the processor.

7. The system of claim 6, wherein the at least one sensor is configured for transmitting sensor data to the processor.

8. The system of claim 1, wherein the step of calculating metadata further comprises:
comparing the sensor data to a lookup table and reading a dew point of the flue gases and target water content of the flue gases at 100% humidity of the flue gases.

9. A combined cycle energy unit (CCEU), comprising:
a gas turbine energy unit including an outlet for flue gases and further comprising:
  a regulating nozzle for injecting water into the flue gases from the outlet of the gas turbine energy unit;
  a condenser apparatus for extracting water solely from flue gases from the outlet of the gas turbine energy unit;
  a pump for pumping water directly from the condenser apparatus to the regulating nozzle, wherein the regulating nozzle injects water supplied solely from the condenser apparatus, and wherein the water provided to the regulating nozzle is devoid of any chemical treatment; and
  a processor communicatively coupled to the regulating nozzle, wherein the processor is configured for:
    receiving sensor data comprising a current temperature of the flue gases and a current water content of the flue gases;
    calculating, based on the sensor data, the following metadata: target water content of the flue gases at 100% humidity of the flue gases, and a dew point of the flue gases at said water content;
    calculating, based on the sensor data and the metadata, an amount of water to inject into the flue gases wherein said amount of water is configured for: 1) increasing a water content of the flue gases to the target water content, so as to reach 100% humidity of the flue gases; 2) lowering a temperature of the flue gases to below the dew point of the flue gases and 3) such that all of said amount of water is absorbed by the flue gases; and
    transmitting control signals to the regulating nozzle, and wherein the control signals are configured to command the regulating nozzle to inject said amount of water into the flue gases.

10. The CCEU of claim 9, wherein the regulating nozzle comprises:
an aperture for egress of water, and a motor for opening and closing the aperture.

11. The CCEU of claim 9, wherein the regulating nozzle comprises:
an aperture for egress of water, and a valve for opening and closing the aperture.

12. The CCEU of claim 9, further comprising:
at least one sensor located in the outlet of the gas turbine energy unit, wherein the at least one sensor comprises both a temperature sensor and a humidity sensor, and wherein both the temperature sensor and the humidity sensor are is communicatively coupled with the processor.

13. The CCEU of claim 12, wherein the at least one sensor is configured for transmitting sensor data to the processor.

14. The CCEU of claim 9, further comprising:
at least one sensor located in the outlet of the gas turbine energy unit, wherein the at least one sensor comprises the following five sensors: a temperature sensor, a humidity sensor, a mass flow sensor, a pressure sensor and a gas composition sensor, and wherein said five sensors are all communicatively coupled with the processor.

15. The CCEU of claim 14, wherein the at least one sensor is configured for transmitting sensor data to the processor.

16. The CCEU of claim 9, wherein the step of calculating metadata further comprises:
comparing the sensor data to a lookup table and reading a dew point of the flue gases and target water content of the flue gases at 100% humidity of the flue gases.

* * * * *